US008550165B2

(12) United States Patent
Gupta et al.

(10) Patent No.: US 8,550,165 B2
(45) Date of Patent: Oct. 8, 2013

(54) WELL SERVICING FLUID

(75) Inventors: D. V. Satyanarayana Gupta, The Woodlands, TX (US); Harpreet Singh Dinsa, Calgary Alberta (CA); Ronald Casey Plasier, Calgary Alberta (CA)

(73) Assignee: Baker Hughes Incorporated, Houston, TX (US)

( * ) Notice: Subject to any disclaimer, the term of this patent is extended or adjusted under 35 U.S.C. 154(b) by 466 days.

(21) Appl. No.: 12/855,894

(22) Filed: Aug. 13, 2010

(65) Prior Publication Data

US 2012/0037371 A1 Feb. 16, 2012

(51) Int. Cl.
*E21B 37/00* (2006.01)
*E21B 43/26* (2006.01)
*E21B 43/267* (2006.01)
*C09K 8/64* (2006.01)
*C09K 8/62* (2006.01)

(52) U.S. Cl.
USPC ............... 166/308.3; 166/244.1; 166/305.1; 166/308.4; 166/312; 507/203; 507/219; 507/221; 507/224; 507/266

(58) Field of Classification Search
None
See application file for complete search history.

(56) References Cited

U.S. PATENT DOCUMENTS

| 3,370,650 | A | * | 2/1968 | Watanabe | 166/280.1 |
| 3,692,676 | A | | 9/1972 | Culter et al. | |
| 3,730,275 | A | * | 5/1973 | McClaflin et al. | 166/308.2 |
| 3,757,864 | A | | 9/1973 | Crawford et al. | |
| 4,527,581 | A | * | 7/1985 | Motier | 137/13 |
| 4,573,488 | A | | 3/1986 | Carville et al. | |
| 5,045,219 | A | * | 9/1991 | Trahan et al. | 507/103 |
| 5,499,679 | A | | 3/1996 | Loree | |
| 5,733,953 | A | | 3/1998 | Fairchild et al. | |
| 5,865,260 | A | * | 2/1999 | Jackson et al. | 175/5 |
| 7,256,224 | B2 | | 8/2007 | Martin et al. | |
| 7,271,205 | B2 | | 9/2007 | Mathew et al. | |
| 2008/0032903 | A1 | * | 2/2008 | Starkey et al. | 507/211 |

FOREIGN PATENT DOCUMENTS

EP 0626418 A1 11/1994

OTHER PUBLICATIONS

International Search Report and Written Opinion for Application No. PCT/US2011/044426, dated Nov. 24, 2011.
"FLO MX Pipeline Booster for Crude", Publisher: Baker Hughes, Baker Petrolite, Prduct Data.
"FLO MXA Drag Reducer for Crude Pipelines", Publisher: Baker Hughes, Baker Petrolite.
"FLO MXC Pipeline Booster", Publisher: Baker Hughes, Baker Petrolite, Material Safety Data Sheet.
"FLO MX a Pipeline Booster", Publisher: Baker Hughes, Baker Petrolite, Material Safety Data Sheet.
D.V. Satyanarayana Gupta, et al , Modern Fracturing-Enhancing Natural Gas Production, "Fracturing Fluids and Formation Damage", Chapter 7 (Jan. 2008).
P.S. Carman and K.E. Cawiezel, Successful Breaker Optimization for Polyacrylamide Friction Reducers Used in Slickwater Fracturing, SPE 106162.
Baker Hughes, Material Safety Data Sheet, FLO MX a Pipeline Booster, FLOMXA, Version 11.0, pp. 1-8, dated Apr. 20, 2009.
Baker Hughes, Material Safety Data Sheet, FLO MXC Pipeline Booster, FLOMXC, Version 7.0, pp. 1-8, dated Sep. 2, 2008.

* cited by examiner

*Primary Examiner* — George Suchfield
(74) *Attorney, Agent, or Firm* — Parsons Behle & Latimer

(57) ABSTRACT

The present disclosure is directed to a method of servicing a well. The method comprises providing a well servicing fluid. The well servicing fluid is formulated with the following components comprising, at least one friction reducer chosen from polychloroprenes, vinyl acetate polymers, polyalkylene oxides polyalphaolefins; and a nonaqueous carrier fluid. The well servicing fluid is introduced into the well.

24 Claims, 1 Drawing Sheet

WELL SERVICING FLUID

FIELD OF THE DISCLOSURE

The present disclosure relates generally to a method for servicing a well with a fluid comprising a friction reducer and a nonaqueous carrier fluid.

BACKGROUND

Natural resources such as gas and oil can be recovered from subterranean formations using well-known techniques. The processes for preparing a well bore for the recovery of such resources often employ various well bore servicing fluids. One example of such fluids is hydraulic fracturing fluid, or "frac fluid".

Frac fluids are employed in hydraulic fracturing, which is a common stimulation technique used to enhance production of fluids from subterranean formations in, for example, oil, gas, coal bed methane and geothermal wells. In a typical hydraulic fracturing treatment operation, a viscosified fracturing fluid is pumped at high pressures and high rates into a wellbore penetrating a subterranean formation to initiate and propagate a hydraulic fracture in the formation. Subsequent stages of viscosified fracturing fluid containing particulate matter known as proppant, e.g., graded sand, ceramic particles, bauxite, or resin coated sand, are then typically pumped into the created fracture. The proppant becomes deposited into the fractures, forming a permeable proppant pack. Once the treatment is completed, the fracture closes onto the proppant pack, which maintains the fracture and provides a fluid pathway for hydrocarbons and/or other formation fluids to flow into the wellbore.

The use of slick water fracturing fluids, which employ a friction reducer, but which often do not employ a viscosifying agent, is well known in the industry. Most friction reducers used in slickwater fracture stimulation are high molecular weight polyacrylamides in water based mineral oil emulsions. However, at the concentrations of friction reducer typically employed in slickwater fracturing fluids, which concentrations typically range from about 0.5 gpt to 2 gpt, it is believed that the mineral oil and polyacrylamide in the emulsions can cause a buildup of polymer cake residue that can damage the well formations. For this reason, breakers are sometimes introduced into the slick water fracturing fluids to reduce the size of the polymer chains, and thereby potentially reduce fracture and formation damage.

Well servicing fluids that contain water, such as frac fluids, can also damage some well formations due to adverse water saturation effects, which can include what is known as sub-irreducible water saturation. When exposed to aqueous based fluids, these formations will trap water for long periods of time (e.g., permanently). The saturation of the formation with water can result in reduced permeability to hydrocarbons, which in turn can cause reduced productivity of the well.

These water retention issues are not limited to fracturing fluids, but can result from any well servicing fluids that are aqueous based, including those used during drilling, completion and workover operations. For formations that are not compatible with water, the use of these aqueous based fluids can be a major cause of productivity impairment in hydrocarbon wells.

Thus, there exists a need for improved well servicing fluids that can reduce or eliminate one or more of the problems discussed above.

SUMMARY

An embodiment of the present disclosure is directed to a method of servicing a well. The method comprises providing a well servicing fluid. The well servicing fluid is formulated with the following components comprising, at least one friction reducer chosen from polychloroprenes, vinyl acetate polymers, polyalkylene oxides polyalphaolefins; and a nonaqueous carrier fluid. The well servicing fluid is introduced into the well.

It has been found that by employing the well servicing fluids of the present disclosure, one or more of the following advantages can be realized: nonaqueous and/or hydrocarbon based well servicing fluids with reduced friction pressures can be formed; in some instances the friction reducing agents may provide relative ease of mixing with hydrocarbons; or the methods of the present application may provide reduced damage to well formations due to relatively low friction reducer treat rates and/or the ability to use nonaqueous well servicing fluids.

Figure 1:
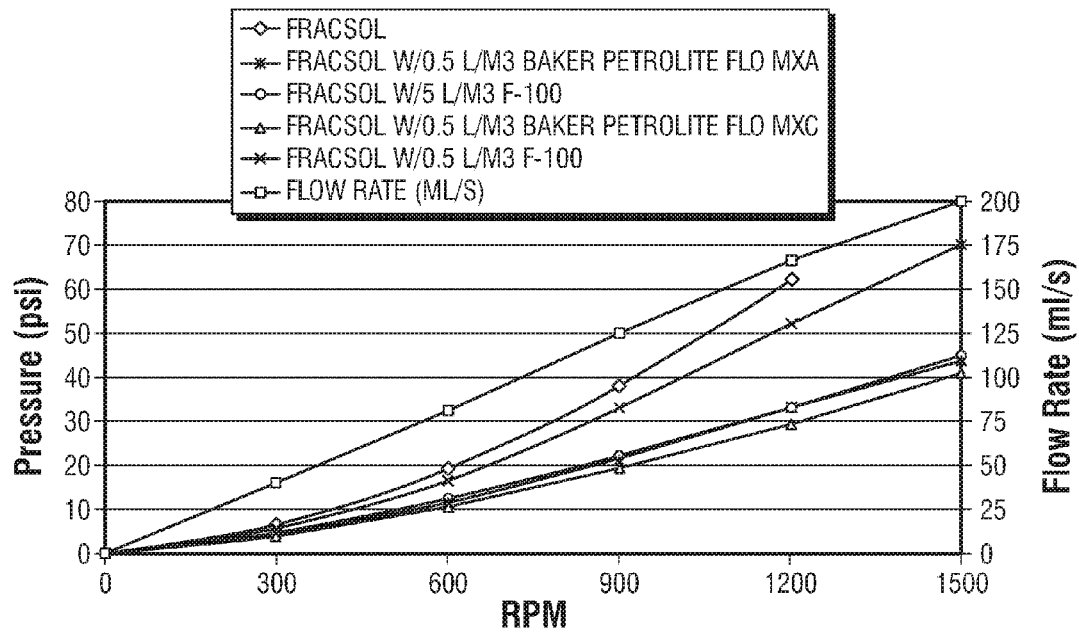
FIG. 1 shows a graph of friction loop pressure and flow rate versus RPM for 0.5 L/m$^3$ of FLO® MXC and FLO MXA Friction Reducers compared with 0.5 L/m$^3$ F-100 and 5 L/m$^3$ F-100, all mixed with FRACSOL™ at 30° C.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The present disclosure is directed to a method of servicing a well, such as, for example, natural gas, geothermal, coal bed methane or oil field wells. The method comprises providing a well servicing fluid formulated with components comprising: at least one friction reducer chosen from polychloroprenes, vinyl acetate polymers, polyalkylene oxides and polyalphaolefins. The well servicing fluid can be introduced into the well to perform various tasks, such as fracturing, frac packing or coiled tubing cleaning, as will be discussed in greater detail below.

Friction Reducer

The friction reducers are polymers capable of reducing friction pressure in a nonaqueous carrier fluid. Examples of suitable friction reducers include polyalphaolefins. In an embodiment, the monomers used to form the polymer can be alpha olefins having from about 4 to about 16 carbon atoms. In an embodiment, the polymer is a polyalphaolefin homopolymer. In another embodiment, the polymer is a polyalphaolefin heteropolymer comprising at least two different alpha olefin repeating units. Other suitable friction reducers include polychloroprenes, vinyl acetate polymers, and polyalkylene oxides. Mixtures of any of the polymer friction reducers described herein can also be employed.

The friction reducer can be polymerized using any suitable techniques. Examples of suitable techniques are well known in the art. In an embodiment, the resulting polymers can have molecular weights of, for example, above 10 million per analysis by gel permeation chromatography (GPC).

Examples of suitable polyalphaolefins include the FLO® family of drag reducing agents available from Baker Pipeline Products, a division of Baker Performance Chemicals, Inc. These FLO family polyalphaolefins include FLO 1004, FLO 1005, FLO 1008, FLO 1010, FLO 1012, FLO 1020 and FLO 1022, among others.

The friction reducer can be in any suitable form that is capable of dissolution and/or mixing with the nonaqueous carrier fluid, such as a dry powder, granulated form, dispersion or liquid. If the friction reducer is provided as dry powder, granulated form or as a dispersion containing particulates, the friction reducer is formulated to dissolve in the nonaqueous carrier fluid upon mixing. Techniques for producing suitable polymers in a granulated form are disclosed in U.S. Pat. No. 7,271,205, the disclosure of which is hereby incorporated by reference in its entirety.

In an embodiment, the friction reducer is a dispersion comprising polyalphaolefin particles. The dispersion can further comprise at least one nonsolvent. Any suitable nonsolvent can be employed, including one or more compounds chosen from alcohols, including glycols and alkyl alcohols, such as isopropyl alcohol; glycol ethers, such as propylene glycol ether; ketones and esters. The nonsolvents can have, for example, from 2 to 6 carbon atoms. In an embodiment, the at least one nonsolvent comprises a glycol ether and an alkyl alcohol.

The dispersions employed in the present discloser can contain other ingredients, such as solvents and anti-agglomeration agents. Examples of suitable dispersions can be found in U.S. Pat. Nos. 5,733,953 and 7,256,224, the disclosures of which are hereby incorporated by reference in their entirety. Examples of suitable commercial dispersions include FLO MX®, FLO MXC and FLO MXA products, all of which are available from Baker Petrolite Corp., which is a subsidiary of Baker Hughes of Houston Tex.

The concentration of friction reducer can vary depending on, among other things, the type of friction reducer, the carrier fluid in which it is used and the application for which the well servicing fluid is being employed. Friction reducer concentrations can range, for example, from about 0.1 gptg (gallons per thousand gallons) to about 10 gptg, based on the total well servicing fluid, such as about 0.5 gptg to about 1 gptg. Ratios and concentrations outside of these ranges can also be employed.

Nonaqueous Carrier Fluid

Any suitable nonaqueous carrier fluid that is usable for servicing a well can be employed. For example, nonaqueous fracturing fluids or coiled tubing cleaning fluids can be employed. Examples of such fluids are well known in the art. The term "nonaqeuous carrier fluid" as used herein is defined to mean a carrier fluid that contains 5% water by weight or less, based on the total weight of the carrier fluid. In embodiments, the nonaqueous carrier fluid can contain 1% by weight water or less, or substantially no water.

In an embodiment, the nonaqueous carrier fluid comprises a hydrocarbon. Any hydrocarbon that is suitable as a well servicing fluid, such as for fracturing or coiled tubing cleanouts, can be employed. Examples of suitable hydrocarbons include aliphatic $C_6$ to $C_{18}$ hydrocarbons, such as heptanes, octanes, nonanes, decanes, undecanes, dodecanes, tridecanes, tetradecanes, pentadecanes, and hexadecanes; and aromatic hydrocarbons, such as toluene and benzenes, including benzene, ethylbenzene, 1,2-dimethylbenzene, 1,3-dimethylbenzene, 1,4-dimethylbenzene, and trimethylbenzene; and mixtures of any of the above hydrocarbons. In an embodiment, the nonaqueous carrier can comprises aromatic hydrocarbons and aliphatic hydrocarbons.

Examples of commercially available hydrocarbons include FRACSOL™, which is available from Enerchem, located in Calgary, Alberta, Canada, and which contains a mixture of $C_7$ to $C_{16}$ alkanes, toluene, benzene and xylene, as described in more detail in U.S. Pat. No. 5,499,679, the disclosure of which is hereby incorporated by reference in its entirety; and XYSOL, available from Enerchem, located in Calgary, Alberta, Canada.

The concentration of carrier fluid can vary depending on the type of carrier fluid and the application for which the well servicing fluid is being employed. Nonaqueous carrier concentrations can range, for example, from about 90% by weight or more, such as about 98% by weight to about 100% by weight, based on the total weight of the well servicing fluid.

Surfactants

In addition to the ingredients discussed above, the well servicing fluid can optionally include a surfactant. Any suitable surfactant that is usable in a nonaqueous well servicing fluid can be employed. A variety of surfactants are well known in the art. Examples of suitable surfactants can include any hydrocarbon soluble surfactant, such as, for example NE-118H, which is available from BJ Services Company LLC, of Houston, Tex. In an embodiment, no surfactants are employed.

Viscosifying Agents

Another optional ingredient that may be employed in the well servicing fluids is a viscosifying agent. Any viscosifying agent suitable for adjusting the viscosity of nonaqueous fluids can potentially be used. For example, the viscosifying agent can be an oil gelling agent, such as a phosphate ester or an aluminum soap or aluminum fatty acid salt. Employing phosphate esters, aluminums soaps or aluminum fatty acid salts as gelling agents is generally well known in the art.

In an embodiment, the well servicing fluids do not include viscosifying agents, such as phosphate esters or aluminum soaps or aluminum fatty acid salts. Reducing or eliminating phosphate esters can have advantages, as phosphate esters are known to poison refinery catalysts and may have detrimental effects on the environment.

Proppants

Proppants can be mixed with the well servicing fluids of the present application. Any suitable proppant can be employed. Proppants are generally well known for use in fracturing fluids. Examples of suitable proppant include graded sand, glass or ceramic beads or particles, sized calcium carbonate and other sized salts, bauxite grains, resin coated sand, walnut shell fragments, aluminum pellets, nylon pellets, and combinations of the above.

Proppants are well known to be used in concentrations ranging from about 0.05 to about 14 pounds per gallon (about 6 to about 1700 $kg/m^3$) of fracturing fluid composition, but higher or lower concentrations can be used as desired for the particular fracture design.

Nitrogen Gas and Carbon Dioxide

The well servicing fluid can further comprise either one or both of nitrogen gas ($N_2$) or carbon dioxide ($CO_2$). The nitrogen gas and carbon dioxide can be used to form a foam or emulsion with the well servicing fluid; the carbon dioxide is soluble in hydrocarbons and can alternatively be present as dissolved carbon dioxide. Employing nitrogen gas and carbon dioxide in well servicing fluids is well known. It can provide various benefits, including reduced damage to the formation, improved cleanup, favorable energy transfer in the wellbore and good proppant carrying capability.

Other Ingredients

The well servicing fluid can comprise at least one additional compound chosen from breakers, non-emulsifiers, clay stabilization additives, scale dissolvers, biopolymer degradation additives, fluid loss control additives, high temperature stabilizers, and other common and/or optional components.

In an embodiment, the well servicing fluid can comprise relatively low concentrations of water of about 5% by weight water or less, such as, for example, about 2% by weight water or less. In an embodiment, the well servicing fluid comprises substantially no water.

The ingredients of the well servicing fluid can be combined in any suitable order using any suitable technique. For example, the friction reducer can be mixed with the nonaqueous carrier fluid prior to, or simultaneously with, introduction of the well servicing fluid into the well. One of ordinary skill in the art would be able to formulate the well servicing fluids without undue experimentation given the guidance provided by the present disclosure.

As discussed above, the well servicing fluids of the present application can be employed as fracturing or frac pack fluids. Any suitable fracturing or frac packing technique can be employed. Various techniques for fracturing and frac packing wells are generally well known in the art. In an embodiment, the well servicing fluid, which comprises a nonaqueous carrier fluid and a friction reducer of the present disclosure, is pumped into the well at a rate and a pressure sufficient to form fractures that extend into the subterranean formation, thereby providing additional pathways through which fluids being produced can flow into the well bores. In an embodiment, the well servicing fluid can include a proppant, including, for example, any of the proppants discussed herein. The proppant becomes deposited into the fractures and thus holds the fractures open after the pressure exerted on the fracturing fluid has been released.

In another embodiment, the well servicing fluid of the present application can be used for cleaning the well. For instance, the well servicing fluid may be used to clean from a wellbore unwanted particulate matter, such as fills which accumulate in the bottom or bottom portions of oil and gas wellbores. The fill may include proppant, weighting materials, gun debris, accumulated powder, as well as crushed sandstone. The fill might also include general formation debris and well rock in addition to cuttings from drilling muds. The well servicing fluids may be used in conjunction with conventional cleaning equipment to clean the well. For example, the well servicing fluids may be used in conjunction with coiled tubing to clean fill from a wellbore by disturbing particulate solids deposited therein. This can be accomplished by running a coiled tubing assembly in-hole while circulating the fluid through a nozzle having a jetting action directed downhole. This may include creating particulate entrainment by pulling out of hole while circulating the well servicing fluid through a nozzle having a jetting action directed uphole. Example mechanisms and coiled tubing systems include those set forth in U.S. Pat. No. 6,982,008, the disclosure of which is herein incorporated by reference in its entirety.

Any of the methods described herein can comprise removing the well servicing fluid from the well after the fluid contacts the formation. This removing step can be aided by gas pressure caused by carbon dioxide or nitrogen gas. Contacting the formation with the well service fluid and then removing the fluid can remove water from the formation. For effective removal of water from the formation, it is preferred that the well servicing fluid have reduced levels of water, such as any of the relatively low water concentrations discussed herein above. The removed well servicing fluid can be recovered, recycled or disposed of according to industry standard practices.

Removing the well servicing fluid can be performed at any time after the fluid contacts the formation. For example, the contacting step can be performed for a sufficient time for removing water, followed by the removing step. Alternatively, the well can be "shut in", where the contacting step is performed for a prolonged period of time. The length of time can be as short as immediate flow back or for up to several days (e.g. 2 or 3 days) shut in.

While the well servicing fluids have been described herein as fracturing fluids and as cleaning fluids, it is expected that the fluids of the present application will find utility in completion fluids, gravel pack fluids, fluid loss pills, lost circulation pills, diverter fluids, foamed fluids, stimulation fluids and the like.

The present application will be further described with respect to the following Examples, which are not meant to limit the invention, but rather to further illustrate the various embodiments.

EXAMPLES

The above compositions were tested using a friction loop test apparatus. The test apparatus included a 10 foot long, ¼ inch outer diameter and 0.173 inch inner tubing equipped with a pressure gauge to measure friction pressure. A triplex pump attached to an intake was used to pump the fluid from a 4 L container via an intake and into the ¼ inch tubing. The ¼ inch tubing was positioned so that the fluid flowed from the tubing into an inverted carboy having a 1 inch inner diameter coiled tubing to reduce velocity of the fluid. The discharge from the carboy was returned to the 4 L container to complete the loop. A site glass was positioned to allow viewing of the fluid flow through the test apparatus.

Using the above described friction loop test apparatus, the following general procedure was followed: 4 L of FRACSOL was poured into the 4 L container. The pump was turned on and the fluid was circulated through the friction loop until air bubbles were no longer observed in the site glass. The base line friction pressure readings for FRACSOL at 300-1500 rpm were taken. The friction reducer was then added to the FRACSOL and allowed to mix at approximately 30° Celsius for 4 minutes at 1200 rpm. The friction pressure and temperature of the friction reduced fluid was recorded at 300 rpm, 600 rpm, 900 rpm and 1200 rpm.

The above general procedure was used to test the following example compositions. The F-100 used in Examples C and E is a high molecular weight polyacrylate based oil soluble friction reducer, available from BJ Services Company LLC of Houston, Tex.

A. 4 L FRACSOL
B. 4 L FRACSOL
  0.5 L/m$^3$ Baker Petrolite FLO® MXA
C. 4 L FRACSOL
  5 L/m$^3$ F-100
D. 4 L FRACSOL
  0.5 L/m$^3$ Baker Petrolite FLO MXC
E. 4 L FRACSOL
  0.5 L/m$^3$ F-100

Figure 2:
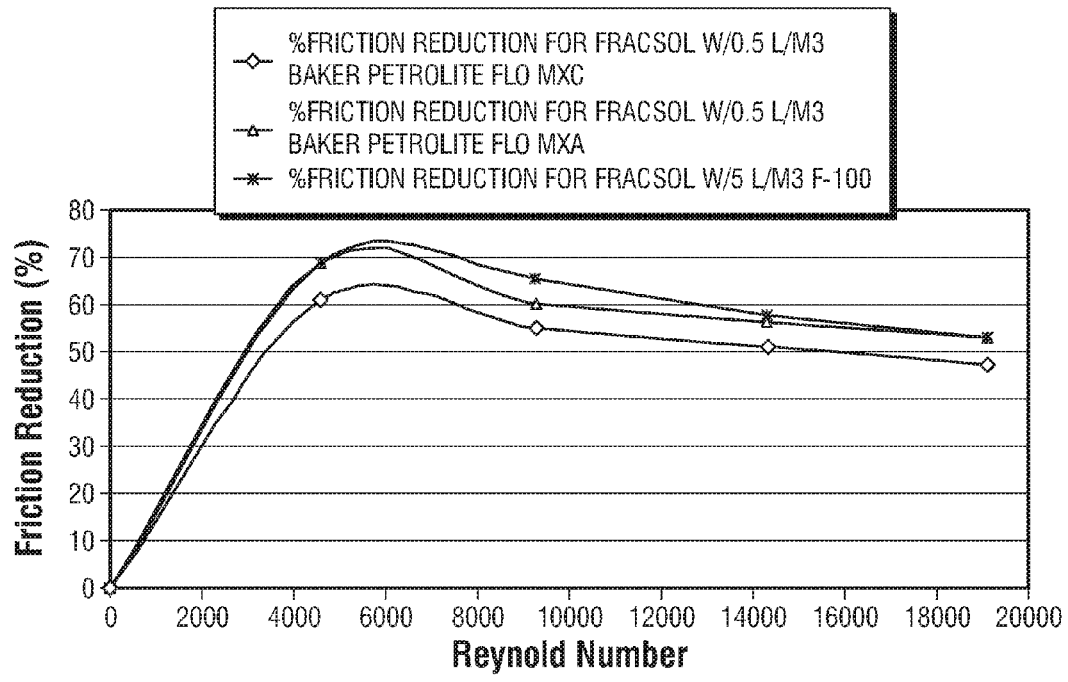
FIG. 2 show a graph of friction reduction verse Reynold's Number for 0.5 L/m$^3$ of FLO® MXC and FLO MXA Friction Reducers compared with 5 L/m$^3$ F-100, all mixed with FRACSOL™ at 30° C.

The results of the friction tests are shown in FIGS. 1 and 2. FIG. 1 shows the friction loop pressure and flowrate versus RPM for compositions A-E above. As shown, each of the FLO MXA and FLO MXC compositions provided significantly reduced friction loop pressures than the FRACSOL alone. The FLO MXA and FLO MXC compositions at 1/10 the concentration (0.5 L/m³), provided comparable or slightly better results than the F-100 at about ten times the concentration (5 L/m³); and significantly reduced friction loop pressures than the F-100 at 0.5 L/m³. As shown in FIG. 2, both the 0.5 L/m³ FLO MXA and FLO MXC compositions showed a comparable percent reduction in friction to F-100 at 5 L/m³ when plotted verses Reynolds number. Additional testing showed that the 0.5 L/m³ of each of the FLO MXA and FLO MXC friction reducers gave the same results as when the concentrations of the FLO MXA and FLO MXC were increased to 1 L/m³ to 5 L/m³ in FRACSOL.

Although various embodiments have been shown and described, the present disclosure is not so limited and will be understood to include all such modifications and variations as would be apparent to one skilled in the art.

What is claimed is:

1. A method of servicing a well, the method comprising:
   providing a well servicing fluid formulated with the following components comprising:
      at least one friction reducer chosen from polychloroprenes and vinyl acetate polymers; and
      a nonaqueous carrier fluid; and
   introducing the well servicing fluid into the well.

2. The method of claim 1, wherein the method further comprises fracturing a well formation by contacting the well formation with the well servicing fluid.

3. The method of claim 1, wherein the method further comprises cleaning a tubular positioned within the well using the well servicing fluid.

4. The method of claim 1, wherein the well servicing fluid comprises about 5% by weight water or less.

5. The method of claim 1, wherein the well servicing fluid further comprises at least one nonsolvent of the friction reducer.

6. The method of claim 5, wherein the at least one nonsolvent is chosen from alcohols, glycol ethers, ketones and esters.

7. The method of claim 5, wherein the at least one nonsolvent comprises a glycol ether and an alkyl alcohol.

8. The method of claim 7, wherein the glycol ether is propylene glycol ether.

9. The method of claim 1, wherein the nonaqueous carrier comprises hydrocarbons.

10. The method of claim 1, wherein the nonaqueous carrier comprises aromatic hydrocarbons and aliphatic hydrocarbons.

11. The method of claim 1, wherein the nonaqueous carrier is in a concentration of 50% by weight or more based on the total weight of the well servicing fluid.

12. The method of claim 1, wherein the concentration of friction reducer ranges from about 0.1 gptg to about 10 gptg, based on the total well servicing fluid.

13. The method of claim 1, wherein the well servicing fluid is formulated to include a surfactant.

14. The method of claim 1, wherein the well servicing fluid is formulated to include an oil gelling agent.

15. The method of claim 14, wherein the oil gelling agent is chosen from phosphate esters, aluminum soaps and aluminum fatty acid salts.

16. The method of claim 1, wherein the well servicing fluid further comprises a proppant.

17. The method of claim 1, wherein the nonaqueous carrier fluid further comprises carbon dioxide.

18. The method of claim 1, wherein the nonaqueous carrier fluid further comprises nitrogen.

19. The method of claim 1, wherein the well servicing fluid is formulated with at least one additional ingredient chosen from non-emulsifiers, viscosifying agents, clay stabilization additives, scale dissolvers, biopolymer degradation additives, fluid loss control additives, breakers and high temperature stabilizers.

20. A method of servicing a well, the method comprising:
   providing a well servicing fluid formulated with the following components comprising:
      at least one friction reducer chosen from polychloroprenes, vinyl acetate polymers, polyalkylene oxides and polyalphaolefins;
      a nonaqueous carrier fluid; and
      at least one nonsolvent of the friction reducer; and
   introducing the well servicing fluid into the well.

21. The method of claim 20, wherein the at least one friction reducer comprises a dispersion of particles in the at least one nonsolvent, the particles being chosen from polychloroprenes, vinyl acetate polymers, polyalkylene oxides, and polyalphaolefins.

22. The method of claim 20, wherein the at least one nonsolvent is chosen from alcohols, glycol ethers, ketones and esters.

23. The method of claim 20, wherein the at least one nonsolvent comprises a glycol ether and an alkyl alcohol.

24. The method of claim 23, wherein the glycol ether is propylene glycol ether.

* * * * *